(12) United States Patent
Weber et al.

(10) Patent No.: US 7,272,909 B2
(45) Date of Patent: Sep. 25, 2007

(54) DANGLER FISHING ROD SUPPORT STAND

(76) Inventors: Michael W. Weber, 16177 W. State Hwy. 48, Birchwood, WI (US) 54817; Edward J. Stuart, N. 10697 County Rd. M, Colfax, WI (US) 54730

( * ) Notice: Subject to any disclaimer, the term of this patent is extended or adjusted under 35 U.S.C. 154(b) by 222 days.

(21) Appl. No.: 11/083,291

(22) Filed: Mar. 18, 2005

(65) Prior Publication Data

US 2006/0179706 A1   Aug. 17, 2006

Related U.S. Application Data

(60) Provisional application No. 60/653,355, filed on Feb. 16, 2005.

(51) Int. Cl.
*A01K 97/10* (2006.01)
(52) U.S. Cl. .......................... 43/21.2; 43/15
(58) Field of Classification Search .................. 43/15, 43/16, 21.2; D22/147, 148
See application file for complete search history.

(56) References Cited

U.S. PATENT DOCUMENTS

| | | | |
|---|---|---|---|
| 1,091,491 A * | 3/1914 | Ebur | 248/515 |
| 1,831,190 A | 11/1931 | Parker | |
| 2,419,378 A * | 4/1947 | Thomas et al. | 43/15 |
| 2,628,443 A * | 2/1953 | Weckerling | 43/15 |
| 2,744,351 A | 5/1956 | Smith | |
| 2,804,277 A | 8/1957 | Kinder | |
| 2,811,801 A | 11/1957 | Daniel | |
| 2,918,746 A | 12/1959 | Hamrick | |
| 2,964,868 A | 12/1960 | Bennett | |
| 3,170,262 A | 2/1965 | Hall | |
| 3,309,808 A * | 3/1967 | George, Sr. | 43/15 |
| 3,973,346 A | 8/1976 | Mason | |
| 3,992,798 A | 11/1976 | Schmitt, Sr. | |
| 4,004,365 A | 1/1977 | Manchester | |
| 4,031,651 A | 6/1977 | Titze | |
| 4,142,315 A | 3/1979 | Hoffman | |
| 4,177,595 A | 12/1979 | Chon | |
| 4,344,248 A | 8/1982 | Brophy, Sr. et al. | |
| 4,397,113 A * | 8/1983 | Pinson | 43/15 |
| 4,407,089 A | 10/1983 | Miller | |
| 4,620,387 A * | 11/1986 | Bloom | 43/17 |

(Continued)

*Primary Examiner*—Kimbelry S. Smith
(74) *Attorney, Agent, or Firm*—Tipton L. Randall

(57) ABSTRACT

A support stand assembly for a rod and reel combination comprises a horizontal base member with a vertical support member extending from the base member. A linear support arm member is pivotally secured at a first end to the vertical support member, with the support arm member extending horizontally in a support position and pivoting upwardly to a release position. A stop member is secured adjacent a second end of the support arm member with a portion of the arm member extending beyond the stop member. An attachment member is adapted for securement to the rod of a rod and reel combination. The attachment member engages with the portion of the arm member extending beyond the stop member to support the rod and reel combination. In use, the attachment member is secured at the balance point of the rod and reel combination and engaged with the portion of the arm member extending beyond the stop member to support the rod and reel combination in a horizontal position. The support arm member disengages from the attachment member upon pivoting of the support arm member to the release position by upward movement of the rod and reel combination.

19 Claims, 7 Drawing Sheets

U.S. PATENT DOCUMENTS

| | | |
|---|---|---|
| 4,866,873 A | 9/1989 | Van Valkenburg |
| 5,038,511 A | 8/1991 | Gessner |
| 5,119,580 A | 6/1992 | Schulte et al. |
| 5,501,028 A | 3/1996 | Hull et al. |
| 5,571,228 A | 11/1996 | McMurtrie |
| 5,613,318 A | 3/1997 | Hislop |
| 5,685,107 A * | 11/1997 | Sweet ........................ 43/21.2 |
| 5,778,592 A * | 7/1998 | Malmberg .................. 43/21.2 |
| 5,934,004 A | 8/1999 | Koe |
| 6,094,852 A * | 8/2000 | Roach ........................... 43/16 |
| 6,129,251 A | 10/2000 | Lajoie |
| 6,196,513 B1 | 3/2001 | Edwards et al. |
| 6,643,974 B2 | 11/2003 | Ruiz et al. |
| 6,802,150 B2 | 10/2004 | Harden |
| 2005/0229471 A1* | 10/2005 | Willard ...................... 43/21.2 |
| 2007/0011934 A1* | 1/2007 | Rayfield ........................ 43/17 |

* cited by examiner

DANGLER FISHING ROD SUPPORT STAND

CROSS-REFERENCE TO RELATED APPLICATIONS, IF ANY

This application claims the benefit under 35 U.S.C. § 119(e) of co-pending provisional application Ser. No. 60/653,355, filed 16 Feb., 2005. Application Ser. No. 60/653,355 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for supporting a fishing rod and reel combination and, more particularly, to a quick release device for supporting a fishing rod and reel combination and, most particularly, to a portable quick release device for supporting a fishing rod and reel combination.

2. Background Information

When fishing with a rod and reel combination, the angler may wish to have a safe and efficient way to maintain his fishing line and bait in the water, yet not be required to hold the rod and reel combination in his hands. The classic example of a support for a rod and reel combination is simply a forked stick inserted into the ground to support the rod and reel combination at about a 45-degree angle. Although functional for warm weather fishing, the forked stick device is not suitable for use when ice fishing through a hole in the ice. Various devices are used to support a rod and reel combination adjacent to an ice fishing hole with the line extending down the hole with a baited hook attached to it. Patents have been granted for several of these devices, including the following: U.S. Pat. No. 1,831,190 by Parker; U.S. Pat. No. 2,744,351 by Smith; U.S. Pat. No. 2,804,277 by Kinder; U.S. Pat. No. 2,811,801 by Daniel; U.S. Pat. No. 2,918,746 by Hamrick; U.S. Pat. No. 2,964,868 by Bennett; U.S. Pat. No. 3,170,262 by Hall; U.S. Pat. No. 3,973,346 by Mason; U.S. Pat. No. 3,992,798 by Schmitt, Sr.; U.S. Pat. No. 4,004,365 by Manchester; U.S. Pat. No. 4,031,651 by Titze; U.S. Pat. No. 4,142,315 by Hoffman; U.S. Pat. No. 4,177,595 by Chon; U.S. Pat. No. 4,344,248 by Trophy, Sr. et al.; U.S. Pat. No. 4,407,089 by Miller; U.S. Pat. No. 4,866,873 by Van Valkenburg; U.S. Pat. No. 5,038,511 by Gessner; U.S. Pat. No. 5,119,580 by Schulte et al.; U.S. Pat. No. 5,501,028 by Hull et al.; U.S. Pat. No. 5,571,228 by McMurtrie; U.S. Pat. No. 5,613,318 by Hislop; U.S. Pat. No. 5,934,004 by Koe; U.S. Pat. No. 6,129,251 by Lajoie; U.S. Pat. No. 6,196,513 by Edwards et al.; U.S. Pat. No. 6,643,974 by Ruiz et al., and U.S. Pat. No. 6,802,150 by Harden. These devices have their shortcomings which impede a quick response by the angler when a fish bites the bait.

Applicants have devised a rod and reel combination support stand assembly that securely holds the rod in approximately a horizontal position and releases the rod from the support stand assembly instantaneously when the angler grasps the rod in response to a fish biting the bait.

SUMMARY OF THE INVENTION

The invention is directed to a support stand assembly for a rod and reel combination. The support stand assembly is adapted for receiving and securing a rod and reel combination having a balancing point. In one embodiment, the support stand assembly comprises a vertical support member adapted for extending from a support surface. A linear support arm member is pivotally secured at a first end to the vertical support member, with the support arm member extending substantially horizontally in a support position and pivoting upwardly to a release position. A stop member is secured adjacent a second end of the support arm member, with a portion of the arm member extending beyond the stop member. An attachment member is adapted for securement to the rod of a rod and reel combination proximal the balancing point thereof. The attachment member is engagable with the portion of the support arm member extending beyond the stop member to support the rod and reel combination. In use, the attachment member, adapted for securement at the balance point of the rod and reel combination, is engaged with the portion of the support arm member extending beyond the stop member to support the rod and reel combination in a horizontal position. The support arm member disengages from the attachment member upon upward pivoting of the support arm member to the release position, caused by upward movement of the attachment member secured to a rod and reel combination proximal the balancing point thereof.

In a preferred embodiment of the invention, the support stand assembly comprises a horizontal base member with a vertical support member extending from the base member. The vertical support member has a vertical slot extending from an end opposite the base member. A linear support arm member is pivotally secured at a first end to the vertical support member within the vertical slot therein. The support arm member extends in alignment with the vertical slot and substantially horizontally in a support position and is pivotable upwardly to a release position. A stop member is secured adjacent a second end of the support arm member, with a portion of the support arm member extending beyond the stop member. The stop member is movable toward the second end of the support arm member upon upward pivoting of the support arm member. An attachment member is adapted for securement to the rod of a rod and reel combination proximal the balancing point thereof. The attachment member is engagable with the portion of the support arm member extending beyond the stop member to support the rod and reel combination. In use, the attachment member, adapted for securement at the balance point of the rod and reel combination, is engaged with the portion of the support arm member extending beyond the stop member to support the rod and reel combination in a horizontal position. The support arm member disengages from the attachment member upon upward pivoting of the support arm member to the release position, caused by upward movement of the attachment member secured to the rod and reel combination proximal the balancing point thereof.

DESCRIPTION OF THE EMBODIMENTS

Nomenclature
10 Fishing Rod and Reel Support Stand Assembly
15 Horizontal Base Member
20 Vertical Support Member
25 Lower Portion of Vertical Support Member
27 Pointed End of Vertical Support Member
30 Upper Portion of Vertical Support Member
35 Set Screw Member
40 Slot in Vertical Support Member
50 Support Arm Member
52 First Support Arm Fastener
53 Second Support Arm Fastener
55 First End of Support Arm Member
60 Second End of Support Arm Member
70 Stop Member
75 Ball Portion of Stop Member
80 Cylindrical Portion of Stop Member
85 Attachment Member
90 Strap Portion of Attachment Member
95 Ring Portion of Attachment Member
100 Fishing Rod and Reel Support Stand Assembly
G Support Surface
R Fishing Rod
S Fishing Reel Construction The invention is a support stand assembly for a rod and reel combination, adapted for receiving and securing a rod and reel combination. The support stand assembly comprises a vertical support member, adapted for extending from a support surface. A linear support arm member is pivotally secured at a first end to the vertical support member, with the support arm member extending substantially horizontally in a support position and pivoting upwardly to a release position. A stop member is secured adjacent a second end of the support arm member, with a portion of the arm member extending beyond the stop member. An attachment member is adapted for securement to the rod of a rod and reel combination proximal the balancing point thereof. The attachment member is engagable with the portion of the support arm member extending beyond the stop member to support the rod and reel combination. In use, the attachment member, adapted for securement at the balance point of the rod and reel combination, is engaged with the portion of the support arm member extending beyond the stop member to support the rod and reel combination in a horizontal position. The support arm member disengages from the attachment member upon upward pivoting of the support arm member to the release position, caused by upward movement of the attachment member secured to a rod and reel combination proximal the balancing point thereof.

Figure 1:
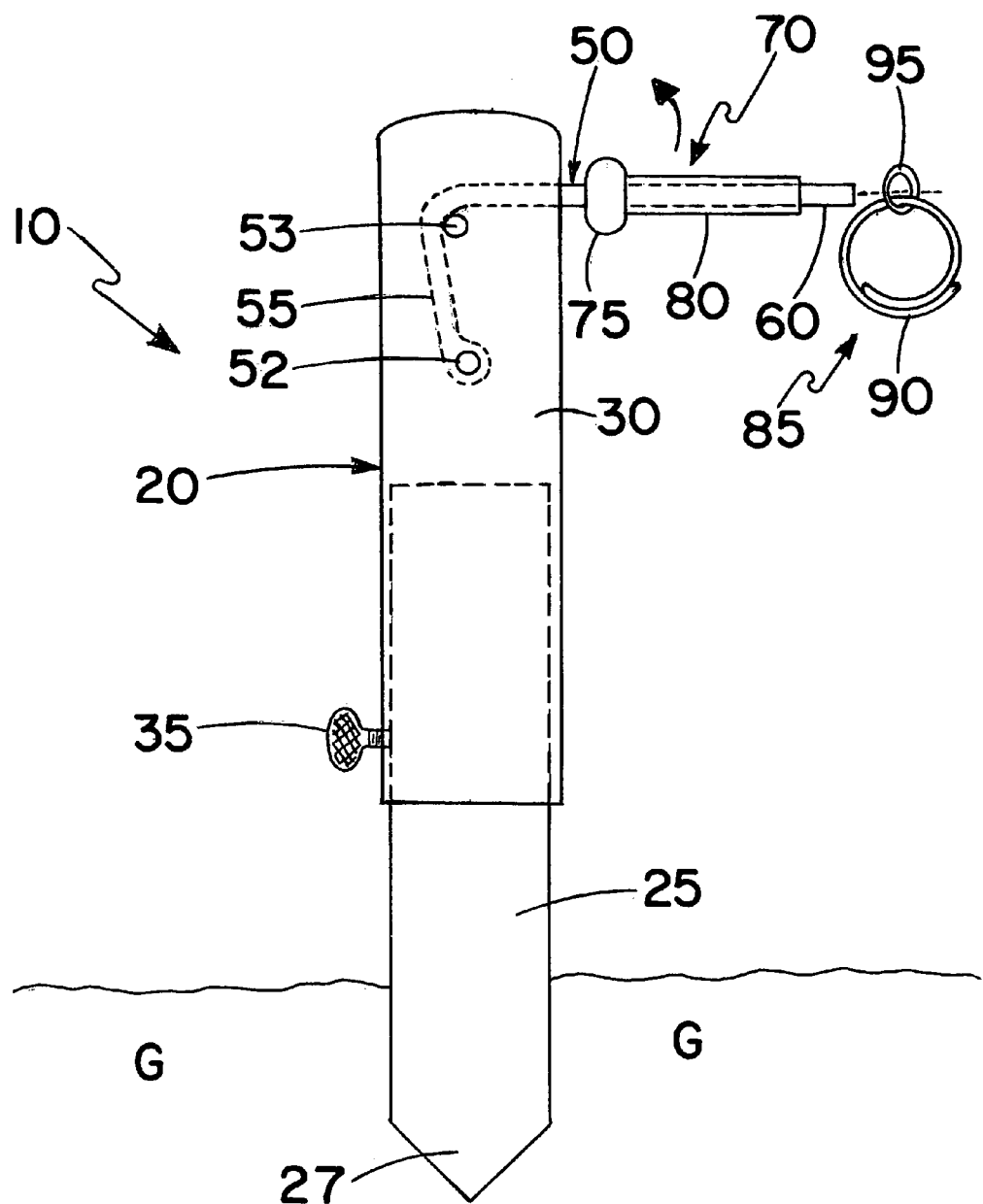
FIG. 1 is a perspective side view of one embodiment of the fishing rod support stand of the present invention.
Figure 2:
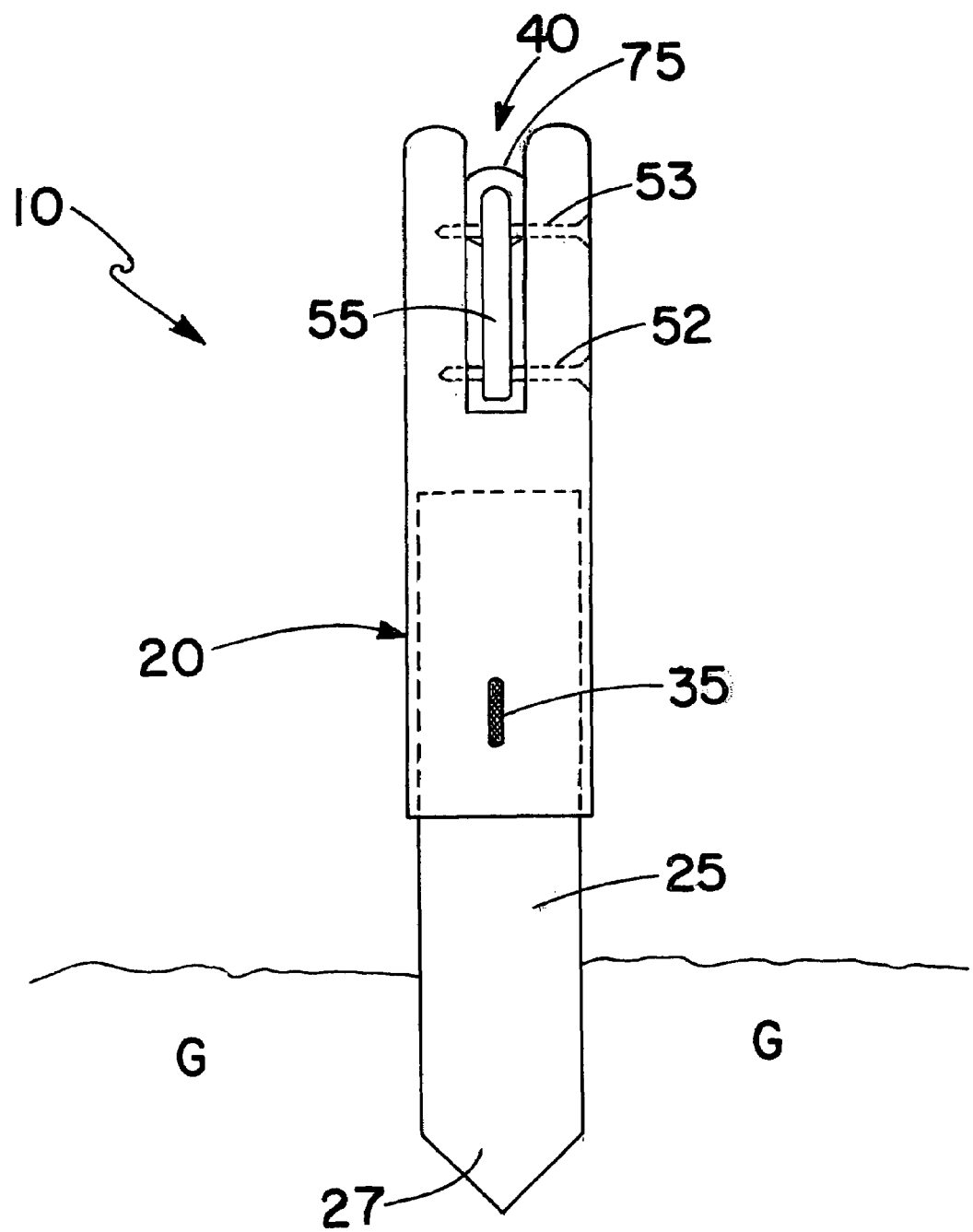
FIG. 2 is another perspective side view of the embodiment of the fishing rod support stand of FIG. 1 of the present invention.

Referring now to FIGS. 1-2, a first embodiment of the support stand assembly 10 is illustrated. The support stand assembly 10 includes a vertical support member 20 adapted for extending from a support surface G, such as a lake or river bank. The embodiment of FIGS. 1 and 2 includes a telescoping vertical support member 20, with a lower portion 25 having a pointed end 27 for penetrating the support surface G, and an upper portion 30 movable over the lower portion 25. A set screw 35, or similar device, is used to hold the upper portion 30 at a selected elevation relative to the lower portion 25. The upper portion 25 of the vertical support member 20 includes a slot 40 open to the top of the upper portion 25 opposite the pointed end 27, best seen in FIG. 2.

A linear support arm member 50 is pivotally secured at a first end 55 to the vertical support member 20. In the embodiment of FIGS. 1 and 2, the first end 55 of the support arm member 50 is pivotally secured within the slot 40 by a first support arm fastener 52, such as, a bolt, a screw or a rod, intersecting the slot 40. The support arm member 50 is curved and also contacts a second support arm fastener 53, such as, a bolt, a screw or a rod, also intersecting the slot 40, such that the support arm member 50 extends substantially horizontally in a support position, as shown in FIGS. 1 and 2. The support arm member 50 extends in alignment with the slot 40 and is pivotable upwardly to a release position, described in detail below.

A stop member 70 is secured adjacent a second end 60 of the support arm member 50, with a portion of the arm member 50 extending beyond the stop member 70, as illustrated in FIG. 1. In the embodiment shown in FIGS. 1 and 2, the stop member 70 includes a ball portion 75 proximal the support member 20 and a cylindrical portion 80 extending toward the second end 60 of the support arm member 50, with the arm member 50 movable within the stop member 70. Most preferably, the length of the support arm member 50 extending from the slot 40 is 3.0 to 3.5 inches, with the stop member 70 having a length of about 2.5 to 3.0 inches and about 0.5 inches of the arm member 50 extending beyond the stop member 70.

Figure 5:
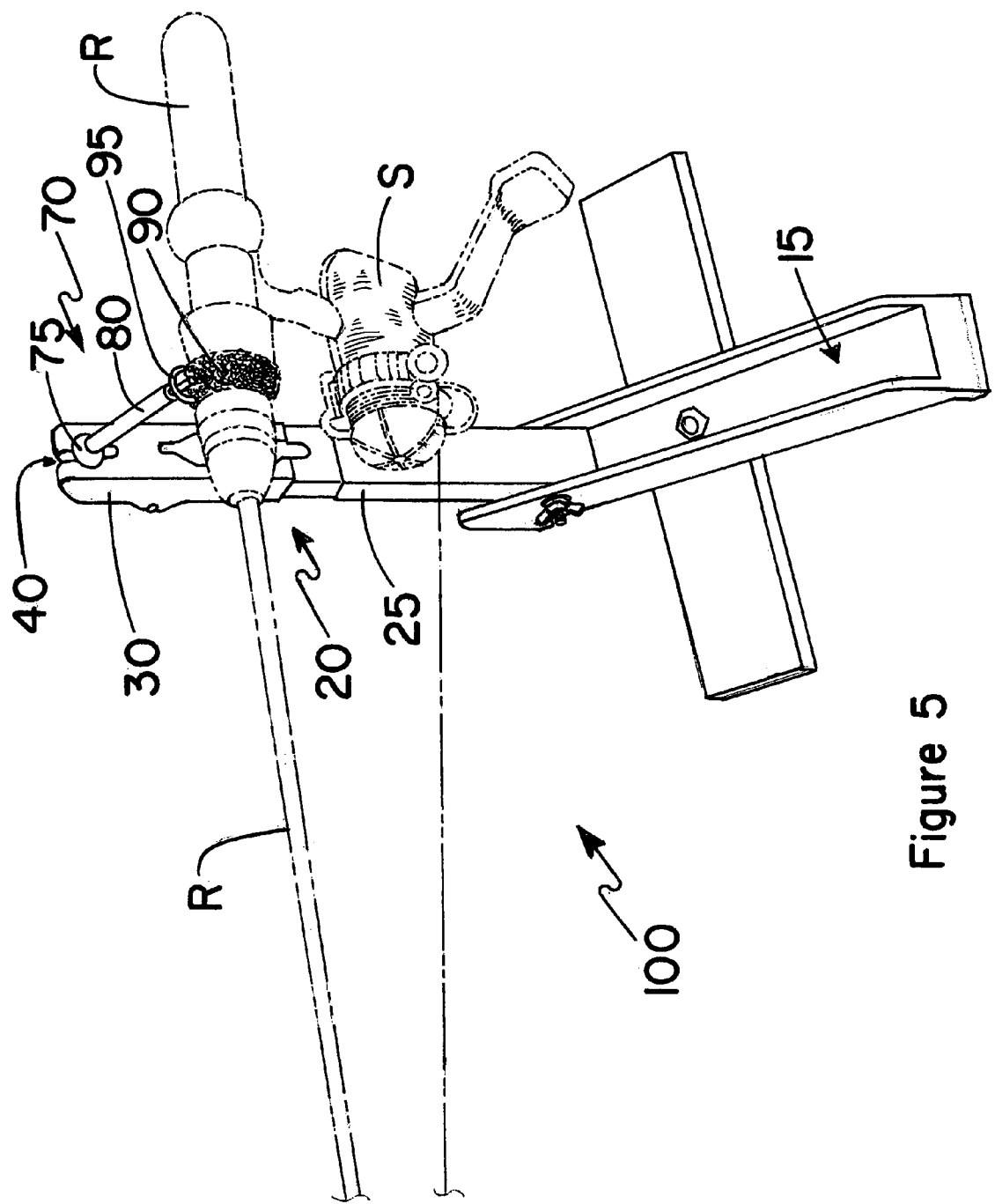
FIG. 5 is a perspective view of a further embodiment of the fishing rod support stand of FIGS. 1 and 2 of the present invention supporting a rod and reel combination.
Figure 7:
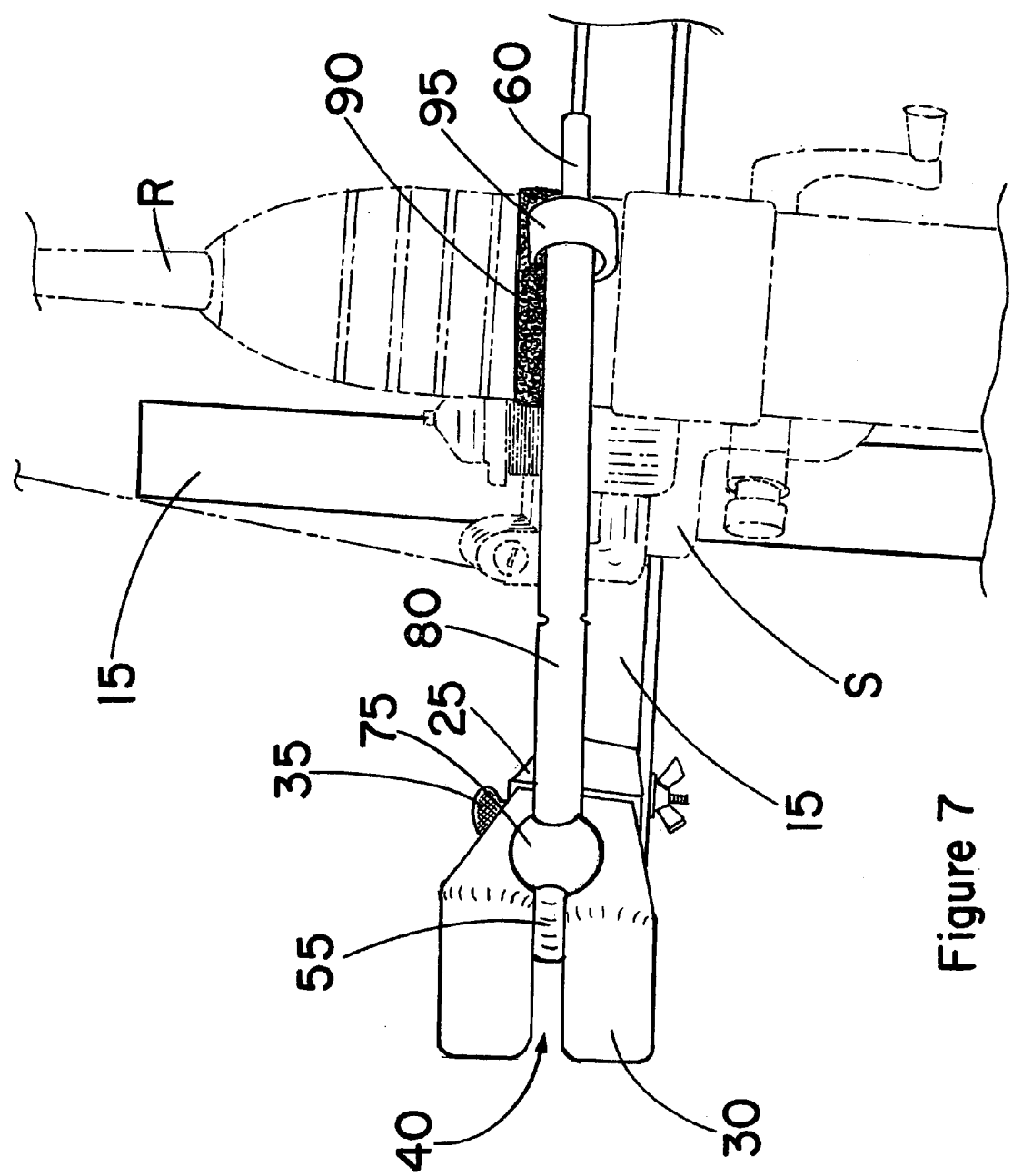
FIG. 7 is a top view of the further embodiment of the fishing rod support stand of FIGS. 1 and 2 of the present invention supporting a rod and reel combination.

Referring again to FIG. 1, an attachment member 85 is adapted for securement to the rod R of a rod and reel combination. In one embodiment, the attachment member 85 includes a strap portion 90 and a ring portion 95, with the strap portion 90 encircling the rod R, preferably at the balance point of the rod and reel combination. The strap portion 90 preferably includes hook and loop tape sections allowing continuous adjustability of the strap portion 90 to accommodate fishing rods of various diameters. Various plastic clip portions can be substituted for the strap portion 95 with equivalent results. Although the ring portion 95 is the preferred embodiment, a clip, a hook, or a similar attachment means, to reversibly engage the second end 60 of the support arm member 50, can be substituted for the ring portion 95 with equivalent results. The ring portion 95 of the attachment member 85 is engaged with the portion of the arm member 50 extending beyond the stop member 70 to support the rod and reel combination, as shown in FIGS. 5 and 7. The ring portion 95 of the attachment member 85 is sized to easily slip over the second end 60 of the support arm member 50, yet the ring portion 95 is no larger than the cylindrical portion 80 of the stop member 70 to maintain the ring portion 95 next to the second end 60 of the support arm member 50.

In use, the first embodiment (FIGS. 1 and 2) of the support stand assembly 10 is inserted into a support surface G, such as the soft bank of a river or lake. The angler casts out his line with the bait attached. With the attachment member 80 secured at the balance point of the rod and reel combination and the support arm member 50 in the horizontal support position, the angler slips the ring portion 95 of the attachment member 85 over the second end 60 of the support arm member 50 extending beyond the stop member 70 to support the rod and reel combination in a horizontal orientation. A fish biting the bait moves the rod tip downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement of the support arm member 50 to the release position allows the ring portion 90 of the attachment member 85 to readily disengage from the support arm member 50. To assist in this disengagement, the support arm member 50 is pivotally anchored within the slot 40 of the linear support member 20, such that upward pivotal movement of the support arm member 50 causes the ball portion 75 of the stop member 70 to contact the edges of the slot 40 and move the stop member 70 toward the end of the support arm member 50, thereby assisting in disengaging the ring portion 95 from the support arm member 50. The completely disengaged support arm member 50 and stop member 70 are illustrated in FIG. 1. An internal secondary stop member (not shown) prevents the stop member 70 from sliding completely off of the end of the support arm member 50.

Figure 3:
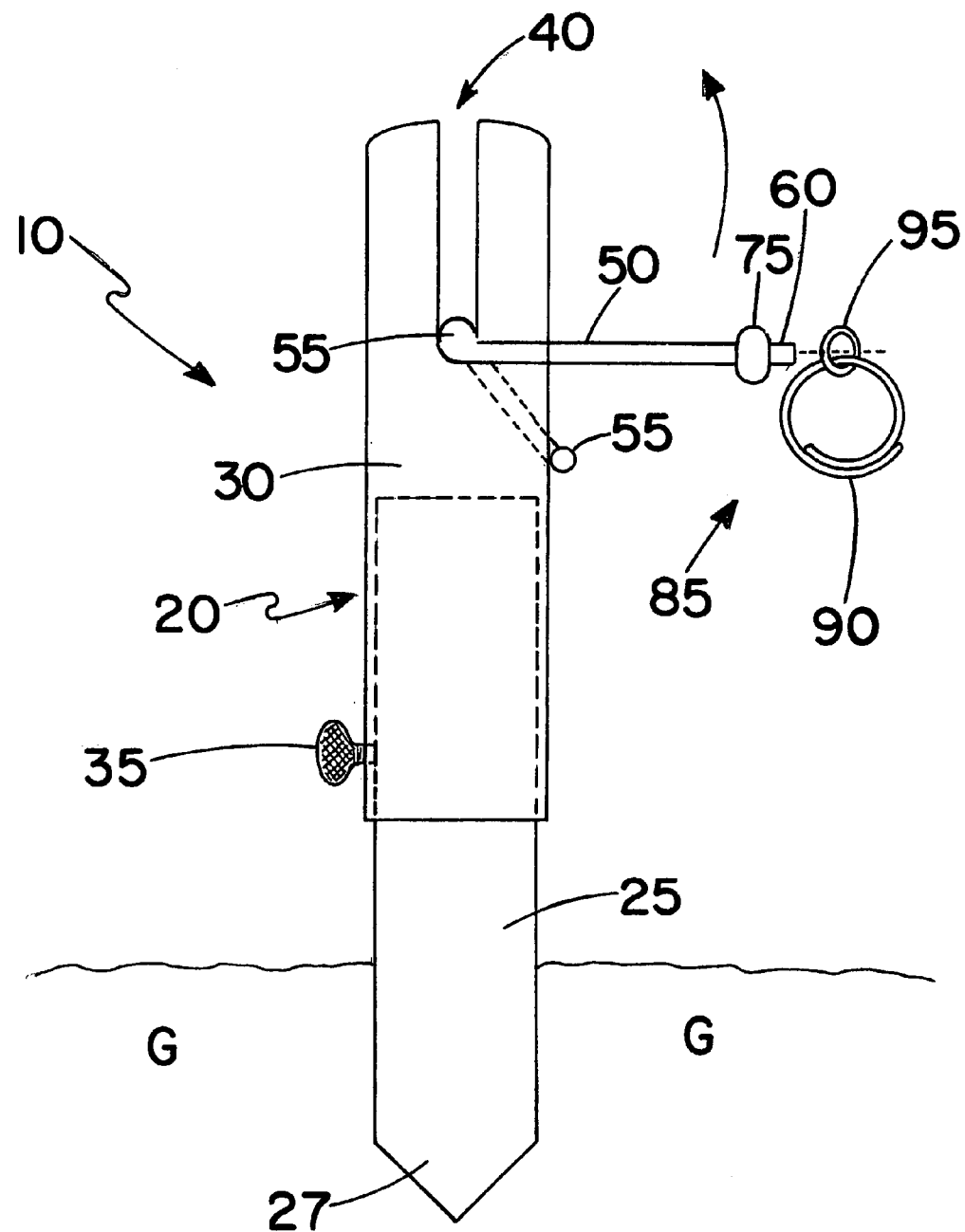
FIG. 3 is a perspective side view of another embodiment of the fishing rod support stand of the present invention.
Figure 4:
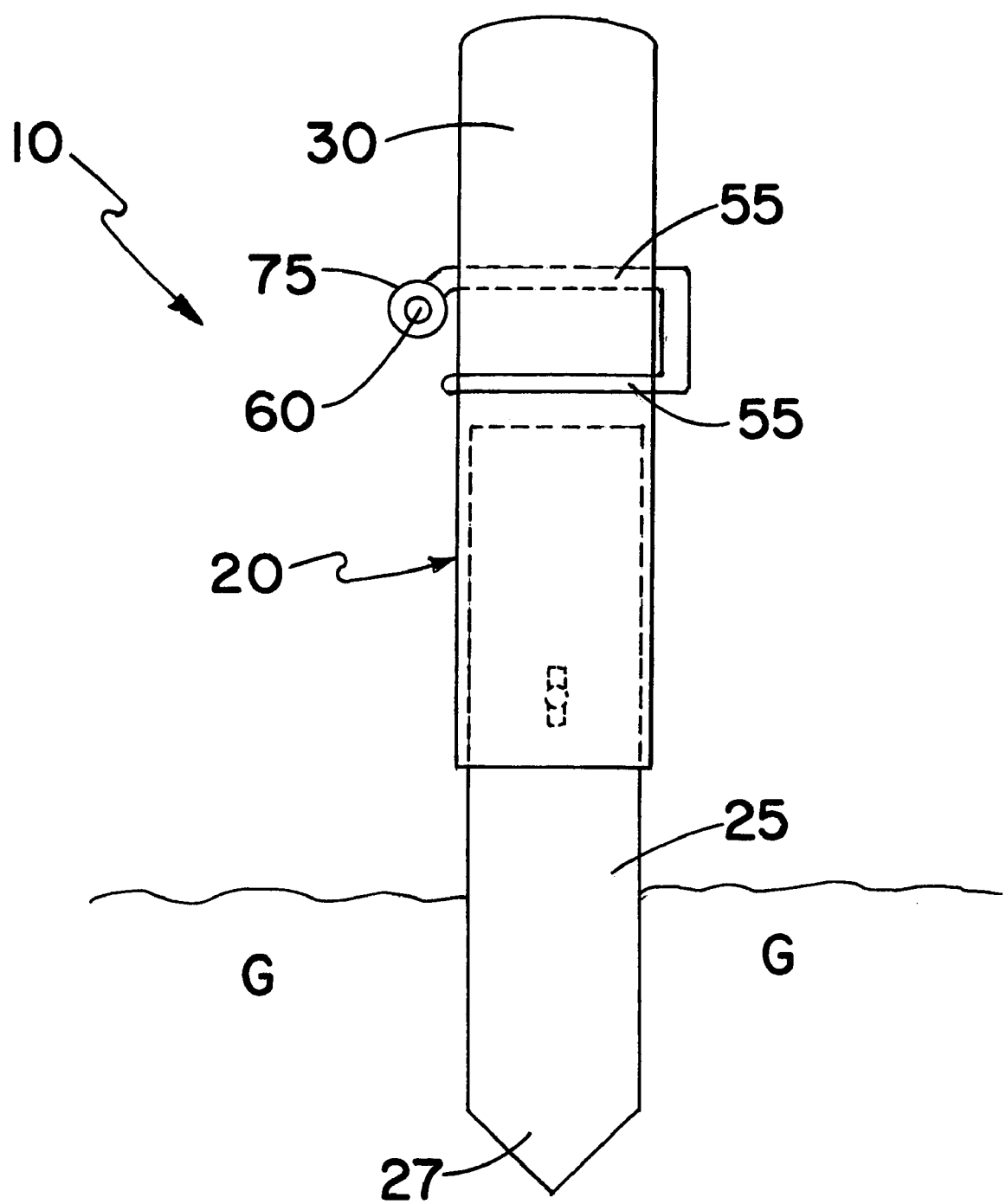
FIG. 4 is another perspective side view of the embodiment of the fishing rod support stand of FIG. 3 of the present invention.

Referring now to FIGS. 3 and 4, a second embodiment of the support stand assembly 10 is illustrated. The second embodiment of the support stand assembly 10 includes a vertical support member 20, adapted for extending from a support surface G, such as a lake or river bank. The embodiment of FIGS. 3 and 4 includes a telescoping vertical support member 20, with a lower portion 25 having a pointed end 27 for penetrating the support surface G, and an upper portion 30 movable over the lower portion 25. A set screw 35, or similar device, is used to hold the upper portion 30 at a selected elevation relative to the lower portion 25. The upper portion 25 of the vertical support member 20 includes a slot 40 open to the top of the upper portion 25 opposite the pointed end 27, as best seen in FIG. 3.

A linear support arm member 50 is pivotally secured at a first end 55 to the vertical support member 20. In the embodiment of FIGS. 3 and 4, the first end 55 of the support arm member 50 is pivotally secured within the slot 40 to hold the support arm member 50 in the support position. The first end 55 of the support arm member 50 is curved with two adjacent 90-degree bends, such that the first end 55 also contacts the outer surface of the linear support member 50, adjacent the slot 40. The support arm member 50 includes a third 90-degree bend, such that the second end 60 of the support arm member 50 extends perpendicularly from the slot 40 and substantially horizontally in a support position, as shown in FIGS. 3 and 4, and is pivotable upwardly to a release position.

A stop member 70 is secured adjacent a second end 60 of the support arm member 50, with a second end 60 of the arm member 50 extending beyond the stop member 70. In the embodiment shown in FIGS. 3 and 4, the stop member 70 comprises a ball portion 75 rigidly fastened to the arm member 50. Most preferably, the length of the support arm member 50 extending horizontally from the slot 40 is about 3.0 to 3.5 inches, with the stop member 70 secured about 0.5 inches from the second end 60 of the support arm member 50.

Figure 6:
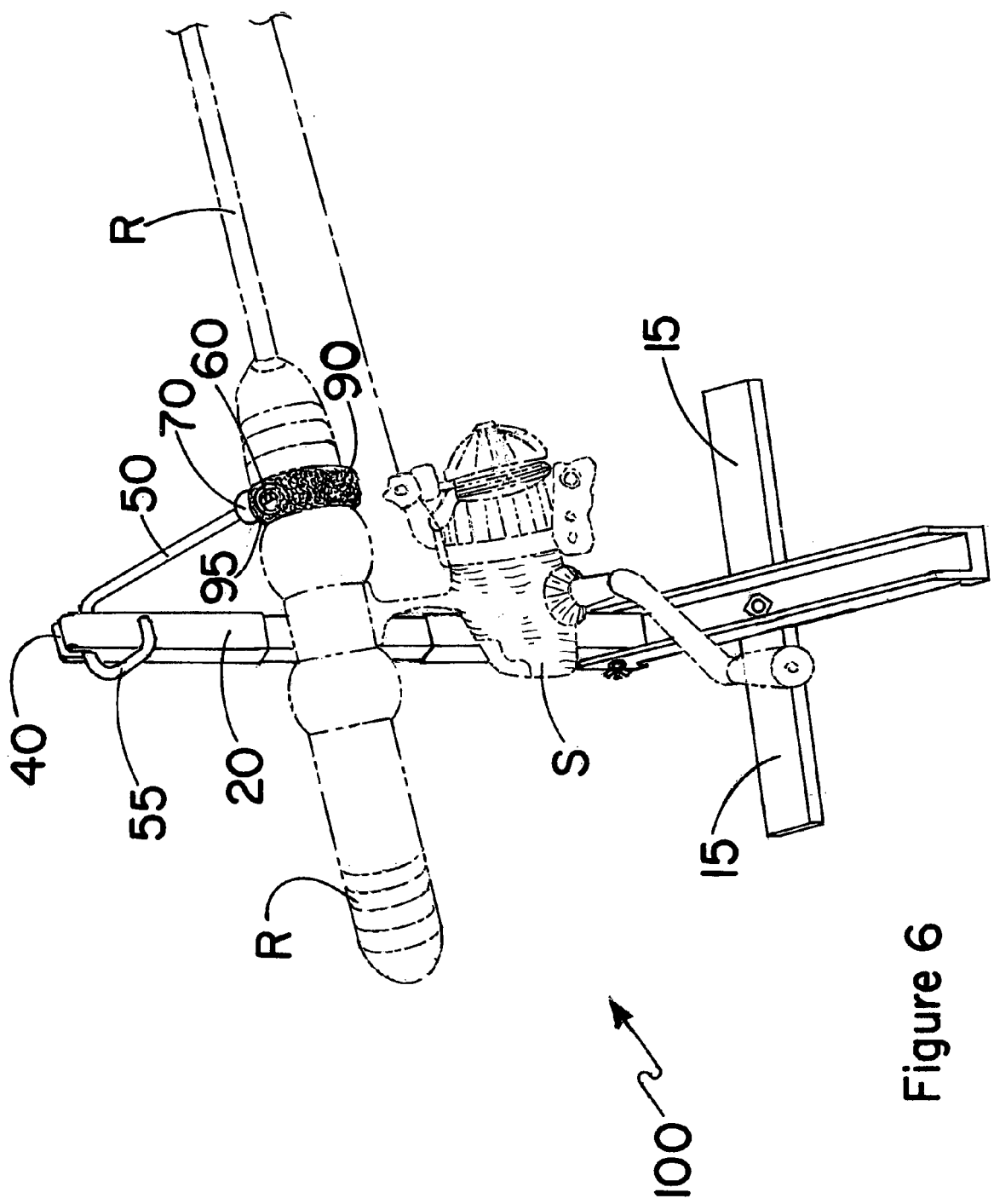
FIG. 6 is a perspective view of a further embodiment of the fishing rod support stand of FIGS. 3 and 4 of the present invention supporting a rod and reel combination.

Referring again to FIG. 3, an attachment member 85 is adapted for securement to the rod R of a rod and reel combination. In one embodiment, the attachment member 85 includes a strap portion 90 and a ring portion 95, with the strap portion 90 encircling the rod R, preferably at the balance point of the rod and reel combination. The strap portion 90 preferably includes hook and loop tape sections allowing continuous adjustability of the strap portion 90 to accommodate fishing rods of various diameters. Various plastic clip portions, secured to the ring portion 95, can be substituted for the strap portion 90 with equivalent results. Although the ring portion 95 is the preferred embodiment, a clip, a hook, or a similar attachment means, to reversibly engage the second end 60 of the support arm member 50, can be substituted for the ring portion 95 with equivalent results. The ring portion 95 of the attachment member 85 is engaged with the portion of the arm member 50 extending beyond the stop member 70 to support the rod and reel combination, as shown in FIGS. 6. The ring portion 95 of the attachment member 85 is sized to easily slip over the second end 60 of the support arm member 50, yet the ring portion 95 is no larger than the stop member 70 to maintain the ring portion 95 next to the second end 60 of the support arm member 50.

In use, the second embodiment (FIGS. 3 and 4) of the support stand assembly 10 is inserted into a support surface G, such as the soft bank of a river or lake. The angler casts out his line with the bait attached. With the attachment member 80 secured at the balance point of the rod and reel combination and the support arm member 50 in the horizontal support position, the angler slips the ring portion 95 of the attachment member 85 over the second end 60 of the support arm member 50 extending beyond the stop member 70 to support the rod and reel combination in a horizontal orientation. A fish biting the bait moves the rod tip downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement of the support arm member 50 to the upwardly angled release position allows the ring portion 90 of the attachment member 85 to readily disengage from the second end 60 of the support arm member 50. The support arm member 50 then returns to the horizontal support position by gravity.

Referring now to FIGS. 5 and 7, a further embodiment of the support stand assembly 100 is illustrated. This further embodiment is particularly well suited for ice fishing. The support stand assembly 100 includes a horizontal base member 15, with a vertical support member 20 extending upwardly from the base member 15. In this embodiment, the base member 15 includes two intersecting pieces of wood or similar material allowing the support stand assembly 100 to rest on a flat surface, such as the ice or the floor of an ice fishing house. The vertical support member 20 is secured to the base member 15. The further embodiment of FIGS. 5 and 7 includes a telescoping vertical support member 20, with a lower portion 25 secured to the base member 15 and an upper portion 30 movable within the lower portion 25. A set screw 35, or similar device, is used to hold the upper portion 30 at a selected elevation within the lower portion 25. The upper portion 25 of the vertical support member 20 includes a slot 40 open to the top of the upper portion 25, as best seen in FIG. 7.

A linear support arm member 50 is pivotally secured at a first end 55 to the vertical support member 20. In the embodiment of FIG. 5, (and FIGS. 1 and 2), the first end 55 of the support arm member 50 is pivotally secured within the slot 40 by a first support arm fastener 52, such as, a bolt, a screw or a rod, intersecting the slot 40. The support arm member 50 is curved and also contacts a second support arm fastener 53, such as, a bolt, a screw or a rod, also intersecting the slot 40, such that the support arm member 50 extends substantially horizontally in a support position, as shown in FIGS. 5. The support arm member 50 extends in alignment with the slot 40 and is pivotable upwardly to a release position, described in detail below.

A stop member 70 is secured adjacent a second end 60 of the support arm member 50, with a portion of the arm member 50 extending beyond the stop member 70, as illustrated in FIGS. 5 and 7. In the further embodiment as shown in FIG. 5, the stop member 70 includes a ball portion 75 proximal the support member 20 and a cylindrical portion 80 extending toward the second end 60 of the support arm member 50, with the arm member 50 movable within the stop member 70. Most preferably, the length of the support arm member 50 extending from the slot 40 is 3.0 to 3.5 inches, with the stop member 70 having a length of about 2.5 to 3.0 inches and about 0.5 inches of the arm member 50 extending beyond the stop member 70.

An attachment member 85 is adapted for securement to the rod R of a rod and reel combination. In one embodiment, the attachment member 85 includes a strap portion 90 and a ring portion 95, with the strap portion 90 encircling the rod R, preferably at the balance point of the rod and reel combination. Although the ring portion 95 is preferred, a clip, a hook, or a similar attachment means can be substituted with equivalent results. The ring portion 95 of the attachment member 85 is engaged with the portion of the arm member 50 extending beyond the stop member 70 to support the rod and reel combination, as shown in FIGS. 5 and 7. The ring portion 95 of the attachment member 85 is sized to easily slip over the second end 60 of the support arm member 50, yet the ring portion 95 is no larger than the cylindrical portion 80 of the stop member 70 to maintain the ring portion 95 next to the second end 60 of the support arm member 50.

This further embodiment of the support stand assembly 100 is used to support a rod and reel combination for ice fishing. The fishing line passing through the eye at the end of the rod R and is positioned through a hole in the ice, with the rod and reel combination supported in an essentially horizontal position, and the support member 15 resting on the ice or floor of an ice fishing house. With the attachment member 80 at the balance point of the rod and reel combination, a fish biting the bait moves the rod tip downwardly and the angler can grasp the rod R and set the hook. This is the situation in which the support stand assembly 100 of the present invention provides an advantage over other similar devices.

As the angler grasps the rod R and lifts the rod and reel combination to set the hook, the upward movement of the support arm member 50 allows the ring portion 90 of the attachment member 85 to readily disengage from the support arm member 50. To assist in this disengagement, the support arm member 50 is anchored within the slot 40 of the linear support member 20, such that upward pivotal movement of the support arm member 50 causes the ball portion 75 of the stop member 70 to contact the edges of the slot 40 and move the stop member 70 toward the end of the support arm member 50, thereby assisting in disengaging the ring portion 95 from the support arm member 50. The completely disengaged support arm member 50 and stop member 70 are illustrated in FIG. 1. An internal secondary stop member (not shown) prevents the stop member 70 from sliding completely off of the end of the support arm member 50.

Referring now to FIG. 6, a further second embodiment of the support stand assembly 100 is illustrated. The further second embodiment of the support stand assembly 100 includes a horizontal base member 15 with a vertical support member 20, extending upwardly from the base member 15. In this embodiment, the base member 15 includes two intersecting pieces of wood or similar material. The vertical support member 20 is secured to the base member 15. In this embodiment, a rigid vertical support member 20 includes a slot 40 open to the top of the vertical support member 20, as shown in FIG. 6.

A linear support arm member 50 is pivotally secured at a first end 55 to the vertical support member 20. In the embodiment of FIG. 6, the first end 55 of the support arm member 50 is pivotally secured within the slot 40. The first end 55 of the support arm member 50 is curved with two adjacent 90-degree bends, such that the first end 55 also contacts the outer surface of the linear support member 50, adjacent the slot 40, to hold the support arm member 50 in the support position. The support arm member 50 includes a third 90-degree bend, such that the second end 60 of the support arm member 50 extends perpendicularly from the slot 40 and substantially horizontally in a support position, as shown in FIG. 6, and is pivotable upwardly to a release position.

A stop member 70 is secured adjacent a second end 60 of the support arm member 50 with a second end 60 of the arm member 50 extending beyond the stop member 70. In the embodiment shown in FIG. 6, the stop member 70 comprises a ball portion 75 rigidly fastened to the arm member 50. Most preferably, the length of the support arm member 50 extending horizontally from the slot 40 is about 3.0 to 3.5 inches, with the stop member 70 secured about 0.5 inches from the second end 60 of the support arm member 50.

Referring again to FIG. 6, an attachment member 85 is adapted for securement to the rod R of a rod and reel combination. In one embodiment, the attachment member 85 includes a strap portion 90 and a ring portion 95, with the strap portion 90 encircling the rod R, preferably at the balance point of the rod and reel combination. The strap portion 90 preferably includes hook and loop tape sections, allowing continuous adjustability of the strap portion 90 to accommodate fishing rods of various diameters. Various plastic clip portions, secured to the ring portion 95, can be substituted for the strap portion 90 with equivalent results. Although the ring portion 95 is the preferred embodiment, a clip, a hook, or a similar attachment means, to reversibly engage the second end 60 of the support arm member 50, can be substituted for the ring portion 95 with equivalent results. The ring portion 95 of the attachment member 85 is engaged with the portion of the arm member 50 extending beyond the stop member 70 to support the rod and reel combination, as shown in FIGS. 6. The ring portion 95 of the attachment member 85 is sized to easily slip over the second end 60 of the support arm member 50, yet the ring portion 95 is no larger than the stop member 70 to maintain the ring portion 95 next to the second end 60 of the support arm member 50.

The further second embodiment (FIG. 6) of the support stand assembly 100 is used to support a rod and reel combination for ice fishing. The angler drops his baited line down an ice fishing hole. With the attachment member 80 secured at the balance point of the rod and reel combination and the support arm member 50 in the horizontal support position, the angler slips the ring portion 95 of the attachment member 85 over the second end 60 of the support arm member 50 extending beyond the stop member 70 to support the rod and reel combination in a horizontal orientation. A fish biting the bait moves the rod tip downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement of the support arm member 50 to the upwardly angled release position allows the ring portion 90 of the attachment member 85 to readily disengage from the second end 60 of the support arm member 50. The support arm member 50 then returns to the horizontal support position by gravity.

All embodiments of the support stand assembly 10 or 100 can accommodate either right-handed or left-handed spinning reels of a rod and reel combination. The angler merely positions the support stand assembly 10 or 100 such that the reel handle is opposite the vertical support member 20 of any of the support stand assemblies 10 or 100 described above.

While the invention has been particularly shown and described with reference to preferred embodiments thereof, it will be understood by those skilled in the art that various changes in form and details may be made therein without departing from the spirit and scope of the invention.

We claim:

1. A rod and reel combination support stand assembly adapted for receiving and securing a rod and reel combination having a balancing point, the support stand assembly comprising:
   a vertical support member adapted for extending from a support surface, the vertical support member including a pointed end adapted for insertion into the support surface and a vertical slot extending from an end opposite the pointed end thereof;
   a linear support arm member pivotally secured at a first end within the vertical slot of the vertical support member with the support arm member extending substantially horizontally in a support position and pivotable upwardly to a release position;
   a stop member secured adjacent a second end of the support arm member with a portion of the support arm member extending beyond the stop member; and
   an attachment member adapted for securement to the rod of a rod and reel combination proximal the balancing point thereof, the attachment member engagable with the portion of the support arm member extending beyond the stop member to support the rod and reel combination;
   whereby the attachment member, adapted for securement at the balance point of the rod and reel combination, is engaged with the portion of the support arm member extending beyond the stop member to support the rod and reel combination in a horizontal position, the support arm member disengaging from the attachment member upon upward pivoting of the support arm member to the release position by upward movement of the attachment member secured to the rod and reel combination proximal the balancing point thereof.

2. The rod and reel combination support stand assembly adapted for receiving and securing a rod and reel combination according to claim 1, wherein the linear support arm member extends in alignment with the vertical slot.

3. The rod and reel combination support stand assembly adapted for receiving and securing a rod and reel combination according to claim 1, wherein the linear support arm member extends perpendicularly to the vertical slot.

4. The rod and reel combination support stand assembly adapted for receiving and securing a rod and reel combination according to claim 1, wherein the vertical support member is telescopically adjustable in length.

5. The rod and reel combination support stand assembly adapted for receiving and securing a rod and reel combination according to claim 1, wherein the stop member is rigidly secured to the support arm member.

6. The rod and reel combination support stand assembly adapted for receiving and securing a rod and reel combination according to claim 1, wherein the stop member is movable toward the second end of the support arm member, the stop member including a ball portion proximal, the vertical support member and a cylindrical portion, the ball portion and cylindrical portion encasing a portion of the support arm member.

7. The rod and reel combination support stand assembly adapted for receiving and securing a rod and reel combination according to claim 6, wherein upward movement of the support arm member contacts the ball portion of the stop member with the vertical support member, thereby moving the stop member toward the second end of the support arm member.

8. The rod and reel combination support stand assembly adapted for receiving and securing a rod and reel combination according to claim 1, wherein the attachment member includes a strap portion adapted for encircling the fishing rod proximal the balancing point thereof, and a ring portion secured to the strap portion.

9. The rod and reel combination support stand assembly adapted for receiving and securing a rod and reel combination according to claim 8, wherein the strap portion includes hook and loop tape providing continuous adjustability in strap length.

10. A rod and reel combination support stand assembly adapted for receiving and securing a rod and reel combination having a balancing point, the support stand assembly comprising:
    a horizontal base member;
    a vertical support member extending from the base member, the vertical support member includes a vertical slot extending from an end opposite the horizontal base member;
    a linear support arm member pivotally secured at a first end within the vertical slot of the vertical support member with the support arm member extending substantially horizontally in a support position and pivotable upwardly to a release position;
    a stop member secured adjacent a second end of the support arm member with a portion of the support arm member extending beyond the stop member; and
    an attachment member adapted for securement to the rod of a rod and reel combination proximal the balancing point thereof, the attachment member engagable with the portion of the support arm member extending beyond the stop member to support the rod and reel combination;
    whereby the attachment member, adapted for securement at the balance point of the rod and reel combination, is engaged with the portion of the support arm member extending beyond the stop member to support the rod and reel combination in a horizontal position, the support arm member disengaging from the attachment member upon upward pivoting of the support arm member to the release position by upward movement of the attachment member secured to a rod and reel combination proximal the balancing point thereof, member secured to a rod and reel combination proximal the balancing point thereof.

11. The rod and reel combination support stand assembly adapted for receiving and securing a rod and reel combination according to claim 10, wherein the linear support arm member extends in alignment with the vertical slot.

12. The rod and reel combination support stand assembly adapted for receiving and securing a rod and reel combination according to claim 10, wherein the linear support arm member extends perpendicularly to the vertical slot.

13. The rod and reel combination support stand assembly adapted for receiving and securing a rod and reel combination according to claim 10, wherein the vertical support member is telescopically adjustable in length.

14. The rod and reel combination support stand assembly adapted for receiving and securing a rod and reel combination according to claim 10, wherein the stop member is rigidly secured to the support arm member.

15. The rod and reel combination support stand assembly adapted for receiving and securing a rod and reel combination according to claim 10, wherein the stop member is movable toward the second end of the support arm member, the stop member including a ball portion proximal the vertical support member and a cylindrical portion, the ball portion and cylindrical portion encasing a portion of the support arm member.

16. The rod and reel combination support stand assembly adapted for receiving and securing a rod and reel combination according to claim 15, wherein upward movement of the support arm member contacts the ball portion of the stop member with the vertical support member, thereby moving the stop member toward the second end of the support arm member.

17. The rod and reel combination support stand assembly adapted for receiving and securing a rod and reel combination according to claim 10, wherein the attachment member includes a strap portion adapted for encircling the fishing rod proximal the balancing point thereof, and a ring portion secured to the strap portion.

18. The rod and reel combination support stand assembly adapted for receiving and securing a rod and reel combination according to claim 17, wherein the strap portion includes hook and loop tape providing continuous adjustability in strap length.

19. A rod and reel combination support stand assembly adapted for receiving and securing a rod and reel combination having a balancing point, the support stand assembly comprising:

a horizontal base member;

a vertical support member extending from the base member, the vertical support member having a vertical slot extending from an end opposite the base member;

a linear support arm member pivotally secured at a first end to the vertical support member within the vertical slot therein, the support arm, member extending in alignment with the vertical slot and substantially horizontally in a support position, and pivotable upwardly to a release position;

a stop member secured adjacent a second end of the support arm member with a portion of the support arm member extending beyond the stop member, the stop member movable toward the second end of the support arm member upon upward pivoting of the support arm member; and an attachment member adapted for securement to the rod of a rod and reel combination proximal the balancing point thereof, the attachment member engagable with the portion of the support arm member extending beyond the stop member to support the rod and reel combination;

whereby the attachment member, adapted for securement at the balance point of the rod and reel combination, is engaged with the portion of the support arm member extending beyond the stop member to support the rod and reel combination in a horizontal position, the support arm member disengaging from the attachment member upon upward pivoting of the support arm member to the release position by upward movement of the attachment member secured to the rod and reel combination proximal the balancing point thereof.

\* \* \* \* \*